(12) United States Patent
Xuan et al.

(10) Patent No.: US 6,549,360 B1
(45) Date of Patent: Apr. 15, 2003

(54) MAGNETIC RECORDING MEDIUM WITH LASER-FORMED SERVO-MARKS

(75) Inventors: Jialuo Jack Xuan, Milpitas, CA (US); Thanh Duc Nguyen, Fremont, CA (US); Chung-Yuang Shih, Cupertino, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/311,363

(22) Filed: May 13, 1999

Related U.S. Application Data
(60) Provisional application No. 60/086,035, filed on May 19, 1998.

(51) Int. Cl.[7] .............................................. G11B 19/02
(52) U.S. Cl. ...................... 360/72.1; 360/78.11; 360/75
(58) Field of Search ........................... 360/77.01, 77.02, 360/77.03, 77.05, 77.08, 75, 131, 135, 72.1, 78.11, 74.6; 369/44.11, 43

(56) References Cited

U.S. PATENT DOCUMENTS

| | | | |
|---|---|---|---|
| 5,120,927 A | 6/1992 | Williams et al. | ....... 219/121.68 |
| 5,296,995 A | * 3/1994 | Yonezawa et al. | ........... 360/135 |
| 5,488,595 A | * 1/1996 | Takeuchi et al. | |

* cited by examiner

Primary Examiner—David Hudspeth
Assistant Examiner—Mitchell Slavitt
(74) Attorney, Agent, or Firm—McDermott, Will & Emery

(57) ABSTRACT

A magnetic recording medium is formed with a distribution of laser micromachined servo-marks in the form of pits or indentations with an attendant reduction in servo-tracking area and increased data-recording speed. Embodiments include laser texturing to form a radially extending linear or arcuate series of circular or elliptical pits across the data zone. The micromachined servo-marks are detected by mechanical or electrical means and denote the beginning and end of magnetically recorded servo-information in a data track, thereby enabling accurate and timely positioning of the read/write head by the servo-controller of the hard drive.

12 Claims, 5 Drawing Sheets

MAGNETIC RECORDING MEDIUM WITH LASER-FORMED SERVO-MARKS

RELATED APPLICATIONS

This application claims priority from Provisional Patent Application Serial No. 60/086,035, filed May 19, 1998, the entire disclosure of which is hereby incorporated by reference herein.

TECHNICAL FIELD

The present invention relates to magnetic recording media containing substantially radially distributed servo-marks and to a method for manufacturing such magnetic recording media. The present invention has particular applicability in forming micromachined servo-marks for use in high areal recording density magnetic recording media with increased data reading speed.

BACKGROUND ART

Thin film magnetic recording disks and disk drives are conventionally employed for storing large amounts of data in magnetizable form. In operation, a typical contact start/stop (CSS) method involves a floating transducer head gliding at a predetermined distance from the surface of the disk due to dynamic pressure effects caused by air flow generated between the sliding surfaces of the transducer head and the disk. During reading and recording (writing) operations, the transducer head is maintained at a controlled distance from the recording surface, supported on a bearing of air as the disk rotates, such that the transducer head can be freely moved in both the circumferential and radially directions allowing data to be recorded on and retrieved from the surface of the disk at a desired position in a data zone.

Conventional magnetic recording media comprise a surface with a dedicated inner annular landing zone on which the transducer head is parked during non-reading and/or non-recording periods, and a data zone on which information is recorded and read. In conventional hard drives, data are stored in terms of bits along tracks. On each track, eight bits form a byte and bytes of data are grouped as sectors. Reading or writing a sector requires knowing the physical location of the data in the data zone so that the servo-controller of the disk drive can accurately position the read/write heads in the correct location at the correct time. As the drive for greater areal recording density increases, it is necessary to increase track recording density.

Conventional disk drives contain several disks, e.g., four, with two read/write heads associated with each disk for a total of eight read/write heads. One conventional approach to the servo-sensing problem is to dedicate the entire upper surface of the first disk, i.e., the top disk, for a servo-surface, and the associated read/write head is employed to read the servo-marks with feedback to the other read/write heads via the servo-controller. Thus, the upper surface of the top disk is not employed for recording data, which is antithetic to the increasing demands for high areal recording density.

Another conventional approach to the servo-sensing problem comprises the use of prerecorded embedded servo-information and dedicated radial spokes. One such type of conventional magnetic recording medium 10 is schematically illustrated in FIG. 1 and comprises data fields 11 having data tracks 12 and radially extending servo-fields 13. Each such radial servo-field 13 typically has the same width as a data bit, e.g., about 1.0 μm, but are about 4 to 5 times longer than the data bit, e.g., about 0.4–0.5 μm vis-à-vis 0.1 μm. Such radially extending servo-fields 13 are written magnetically and divided into different fields. The first field is typically about 100 μm to about 120 μm long and is designed for informing the read/write head where the servo-track begins. The second field is coded by a different pattern to identify the track position. The third and fourth fields are employed for a comparison of track alignment. The fifth field is generally an empty field to inform the read/write head that the servo-track is ending and a data track is beginning. The servo-bits are much larger than the data bits to avoid confusion. After servo-writing, the data tracks are formatted according to the embedded servo-marks and data can then be written between the servo-marks and subsequently erased. Disadvantageously, such conventional approaches to the servo-sensing problem consume a large amount of [areal] area for servo-tracks, thereby reducing the amount of area available for recording the data.

Williams et al., in U.S. Pat. No. 5,120,927, disclose the formation of optical servo-tracks in the form of continuous or non-continuous concentric circles.

There exists a need for a magnetic recording medium having servo-marks which occupy a reduced area of the surface of the magnetic recording medium thereby increasing available area for recording data. There also exists a need for efficient, economical methodology enabling micromachining of a disk surface to provide servo-marks, thereby enabling an increase in areal recording density.

DISCLOSURE OF THE INVENTION

An advantage of the present invention is a magnetic recording medium having a micromachined servo-marks and increased areal recording density.

Another advantage of the present invention is a method of manufacturing a magnetic recording medium having micromachined servo-marks and increased areal recording density.

Additional advantages and other features of the invention will be set forth in the description which follows and in part will be apparent to those having ordinary skill in the art upon examination of the following or may be learned from the practice of the present invention. Advantages of the present invention may be realized and particularly pointed out in the appended claims.

According to the present invention, the foregoing and other advantages are achieved in part by a magnetic recording medium comprising a surface having a data zone containing data tracks with magnetically recorded servo-information; and a distribution of laser textured pits forming a plurality of servo-marks capable of being sensed to enable accurate reading of the servo-information and positioning of a read/write head in the data zone.

A further aspect of the present invention is a method of manufacturing a magnetic recording medium, the method comprising laser texturing a surface of a non-magnetic substrate to form a distribution of pits functioning as servo-marks capable of being sensed to enable reading magnetically recorded servo-information in a data track and accurate positioning of a read/write head on a data zone.

Embodiments of the present invention comprise exposing the surface of a non-magnetic substrate to a laser light beam to form a plurality of protrusions and pits having a substantially circular or substantially elliptical cross section that extend substantially radially across the data zone. The surface of the substrate is then polished, as by chemical-mechanical polishing, to remove the protrusions leaving the radially extending pits having substantially circular or substantially elliptical cross sections. The micromachined pits have relatively small dimensions thereby significantly reducing the size of the servo-marks, i.e., the amount of areal real estate used for sensing the beginning and end of magnetically recorded servo-information and, hence, increasing the available recording area.

Additional advantages and other features of the present invention will become readily apparent to those skilled in this art from the following the detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description should be regarded as illustrative in nature, not as restrictive.

DESCRIPTION OF THE INVENTION

Figure 1:
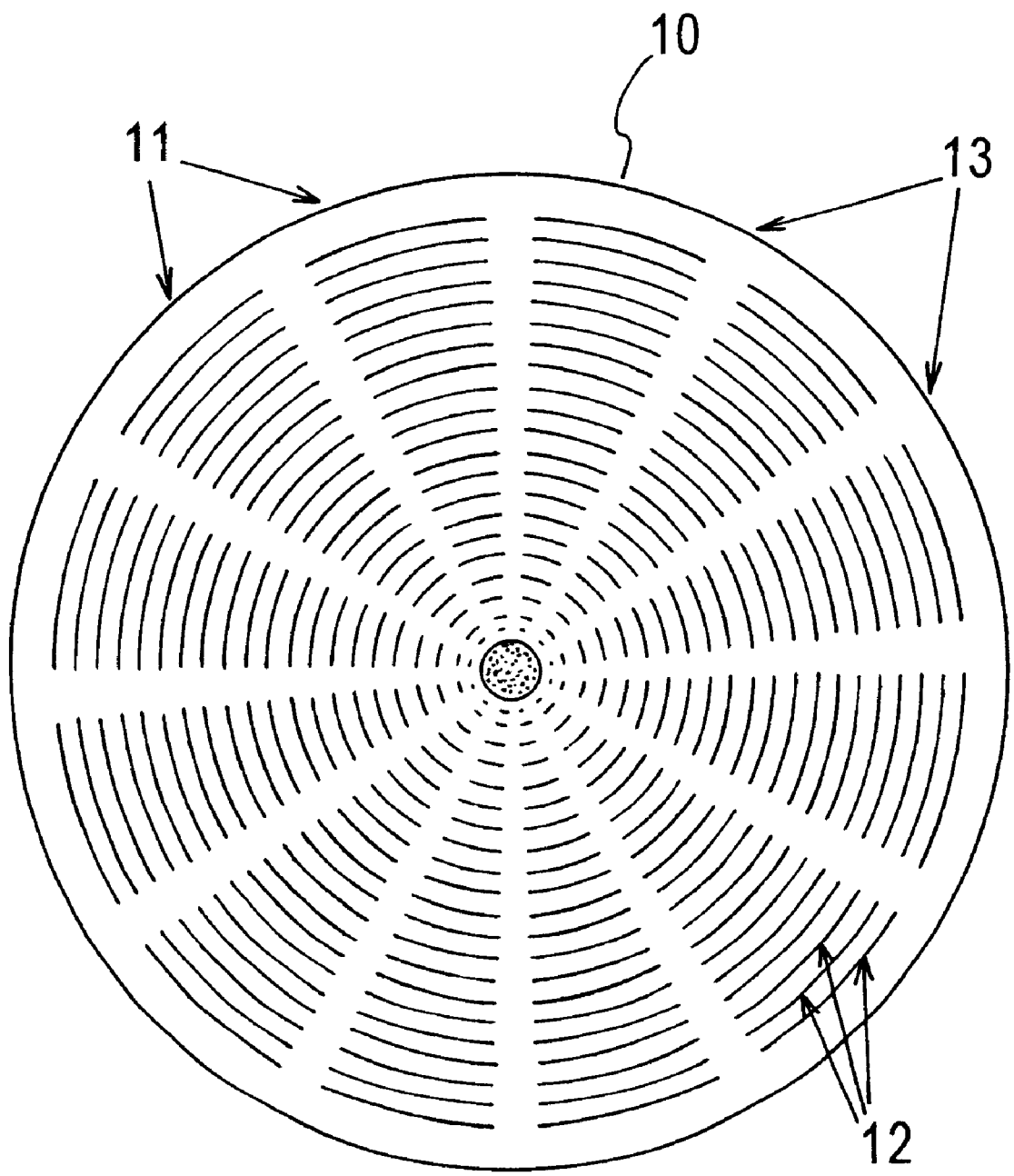
FIG. 1 schematically illustrates the surface of a conventional magnetic recording disk having a magnetically written servo-tracks.

The present invention addresses and solves the problem of areal consumption of a magnetic recording medium by servo-markings which decreases available data recording area. The present invention achieves that objective by forming micromachined servo-pits in the surface of the magnetic recording medium, i.e., substrate, as by laser texturing. Upon laser texturing, protrusions are typically formed. In accordance with embodiments of the present invention, after laser texturing, the surface of the non-magnetic substrate is polished, as by chemical-mechanical polishing, to provide a substantially smooth surface without laser textured asperities to avoid interfering with the read/write head during operation. The non-magnetic substrates employed in embodiments of the present invention can be any of those employed in the manufacture of conventional magnetic recording media, including nickel-phosphorous plated aluminum and aluminum alloy substrates as well as alternative substrates such as glass, glass-ceramic, and ceramic materials.

Embodiments of the present invention include forming micromachined servo-pits capable of being sensed, mechanically or electrically. The servo-pits are formed at the beginning and at the end of magnetically recorded servo-information in substantially concentric circumferentially extending data tracks. The servo-information enables accurate positioning of a read/write head in the data zone by the servo-controller of a conventional disk drive. Embodiments of the present invention comprise traversing the surface of the non-magnetic substrate from a designated beginning of an outer annular data zone in a substantially radial direction to form a linear or arcuate series of pits traversing the entire data zone. The pits can be formed in a substantially circular shape having a diameter of about 0.2 $\mu$m to about 2 $\mu$m, e.g., about 0.3 $\mu$m to about 0.4 $\mu$m. The pits can also be formed in a substantially elliptical shape having a large diameter of about 0.5 $\mu$m to about 3 $\mu$m, e.g., about 1 $\mu$m to about 2 $\mu$m, and a small diameter of about 0.2 $\mu$m to about 2 $\mu$m, e.g., about 0.3 $\mu$m to about 0.4 $\mu$m.

Advantageously, laser textured servo-pits in accordance with embodiments of the present invention can easily be detected to determine the beginning of magnetically recorded servo-information in the data tracks with respect to track location and data track position/alignment. Servo-pits are also formed to denote the end of such servo-information. The use of laser micromachined pits instead of conventional magnetic data advantageously conserves about 100 microns in width space, i.e., an attendant 40% saving vis-à-vis conventional magnetically recorded information to denote the beginning and end of magnetically recorded servo-information as to track location and track position/alignment.

The laser textured servo-pits formed in accordance with embodiments of the present invention can be easily detected mechanical, e.g., based upon air-bearing instability, and electrically detected by mechanically detecting the bump and generating an electrical signal.

The laser textured micromachined servo-pits in accordance with embodiments of the present invention are quite distinguishable from conventional magnetic data bits which are recorded and read by a magnetic/electrical techniques. The servo-pits formed in accordance with the present invention actually affect the surface geometry of the substrate. Upon detecting laser textured micromachined servo-pits formed in accordance with embodiments of the present invention, the magnetically recorded servo-information is read and accurate positioning of a read/write head in the data zone can be implemented employing the servo-controller of a conventional hard drive, similar to conventional servo-feedback.

The formation of circular or elliptical shaped pits is implement in embodiments of the present invention by optical techniques, employing different lenses to generate a circular beam or an elliptical beam and by employing a pulsed-laser or a continuous wave (Cw) laser. In employing CW lasers, the acoustical optical modulator which conforms the duration of the laser beam at a spot can be adjusted so that the resulting beam can be round or to form a circular pit or elongated to form an elliptical pit. Given the objectives of the present invention, the appropriate laser texturing parameters can be optimized in a particular situation to form a linear series of pits, circular or elliptical.

For example, a high-frequency pulsed laser light beam, having a wavelength of 1064 nm, can be focused on a nickel-phosphorous/aluminum substrate surface from a designated inner radius, i.e., the starting radius of the data zone.

Figure 2:
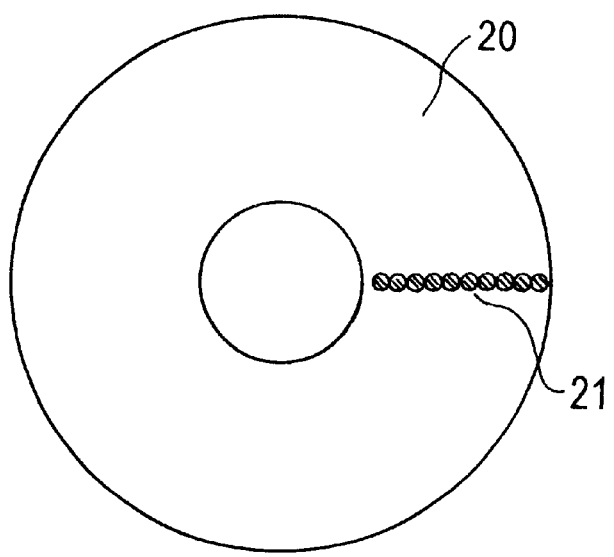
FIG. 2 schematically illustrates a surface of magnetic recording disk having a linear series of substantially radially extending pits in accordance with an embodiment of the present invention.
Figure 3:
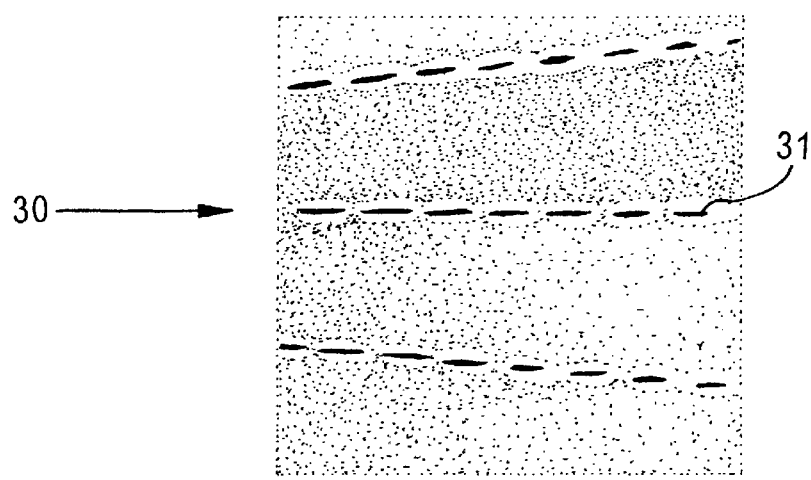
FIG. 3 schematically illustrates another embodiment of a magnetic recording medium of the present invention comprising a plurality of substantially radially extending servo-marks in the form of pits having an elliptical shape.

The impinging focused pulsed laser light beam is then linearly traversed to the outer radius of the data zone. The focused pulsed laser light beam provides accurate heat-energy to the substrate surface to form crater-shaped protrusions linearly extending in substantially the radial direction. Upon subsequent polishing to remove the protrusions, the substrate surface 20 contains a linear series of pits 21 extending substantially in the radial direction as shown in FIG. 2. Alternatively, adjustment of the optical lens set up can achieve pits with elliptical shape 31 as shown in FIG. 3 extending in the radial direction 30. In forming a plurality of linearly extending pits 31, the disk spindle is controlled by a computer to rotate a certain number degrees based on required servo-information, and the laser texturing process repeated to form a set of multi-line marks accurately at a given angle according to the servo requirements for different hard drive designs.

Figure 4:
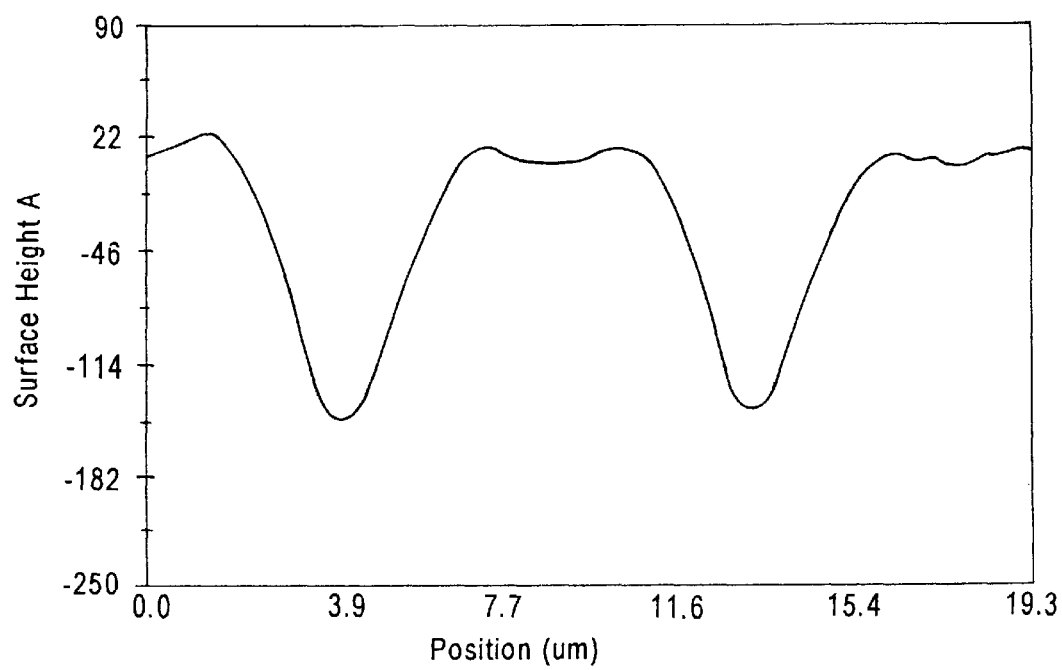
FIG. 4 illustrates a cross sectional view of laser textured pits that function as servo-marks.

In accordance with embodiments of the present invention, the laser-textured surface is polished, as by chemical mechanical polishing, or mechanically textured to remove surface asperities, e.g., protrusions resulting from laser texturing leaving only the pits embedded in the surface, as illustrated by the line segment profile shown in FIG. 4. Such embedded pits do not negatively impact reading/recording operations by the transducer head. The embedded pits will affect electrical signals so the sector position can be accurately detected.

Figure 5:
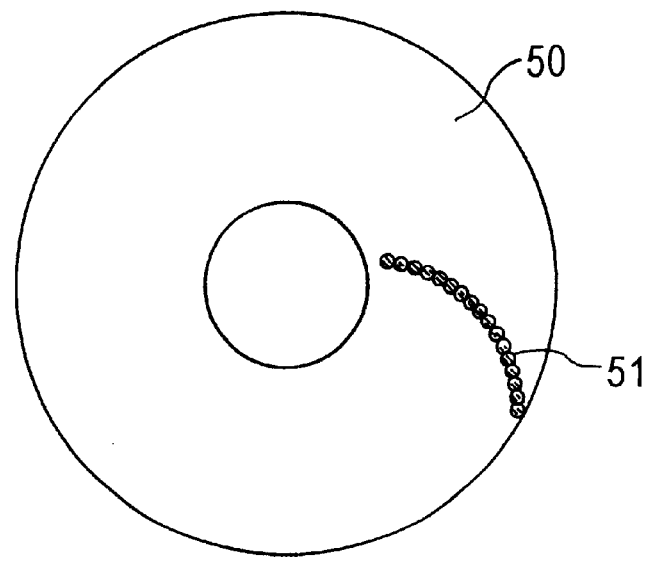
FIG. 5 schematically illustrates another embodiment of the present invention containing an arcuate series of substantially radially extending pits.

Another pattern formed on a substrate surface 50 is illustrated in FIG. 5 and comprises pits 51 extending arcuately in a substantially radial direction. Advantageously, laser texturing can be controlled to form arcuate patterns, thereby enhancing the flexibility of the system to maximize areal recording density.

Figure 6A:
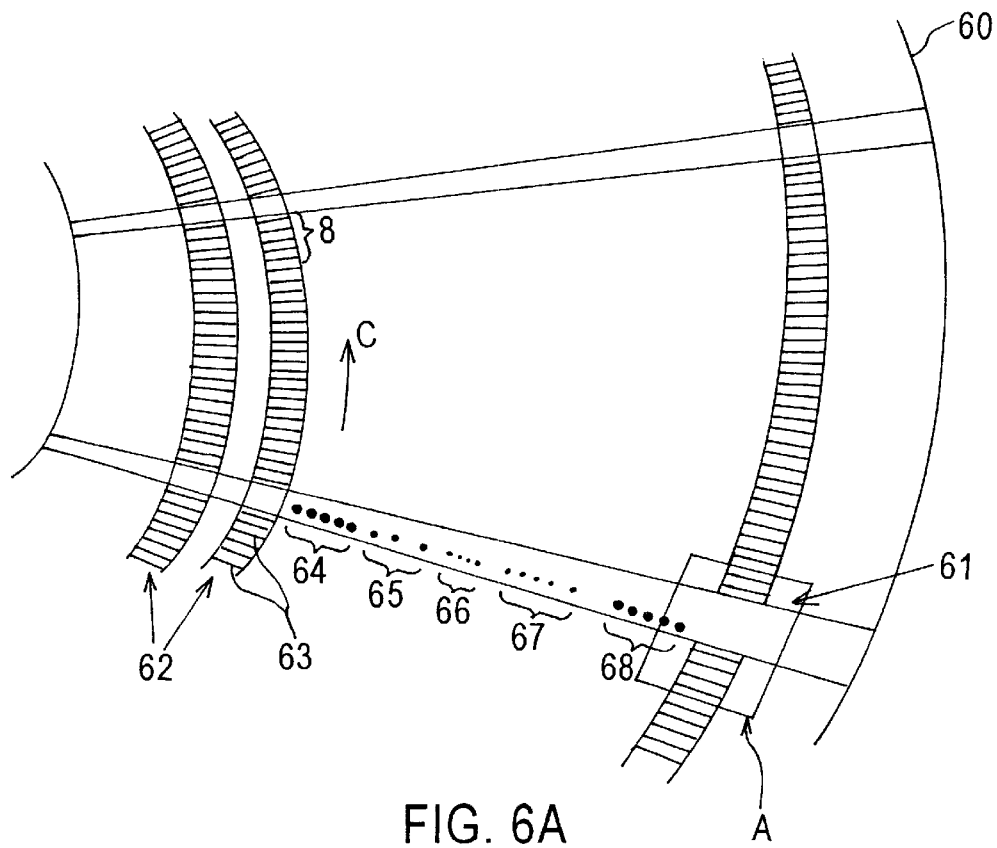
FIG. 6A schematically illustrates a portion of a surface of a magnetic recording disk having micromachined servo-marks in accordance with an embodiment of the present invention.
Figure 6B:
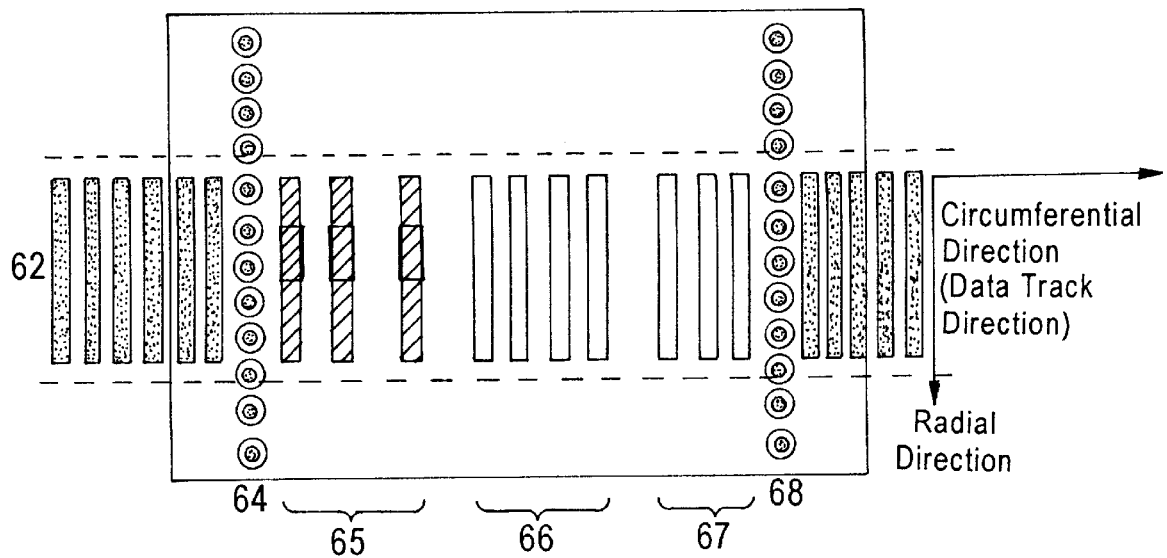
FIG. 6B schematically illustrates a blown up segment of FIG. 6A depicting the use of laser textured servo-marks.

The formation of embedded pits to form as servo-tracks 61 on the surface of a magnetic recording medium 60 is schematically illustrated in FIG. 6 and comprises data tracks 62, containing data bits 63, extending in the circumferential direction "C". The numeral 8 denotes a byte comprising 8 bits. As shown in FIG. 6B, which is an enlarged representation of area A in FIG. 6A, servo-track 61 contains a beginning pattern of micromachined pits 64 and an ending pattern of micromachined pits 68 produced by laser texturing. The portion of each data track 62 between the servo-track 61 containing beginning portion 64 and ending portion 68 contains different patterns magnetically coded to identify the track position 65 and to enable a comparison of data-track alignment 66, 67, between the beginning pattern 64 and ending pattern 68 of servo-track 61. Thus, servo-track 61 typically contains two spaced apart series of micromachined pits 64 and 68.

Figure 7A:
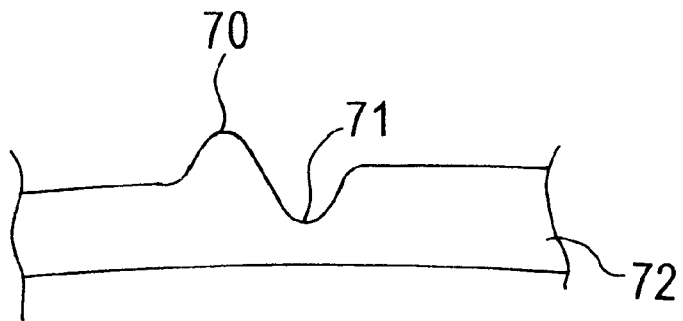
FIGS. 7A and 7B illustrates the formation of bumps and pits by laser texturing.
Figure 7B:
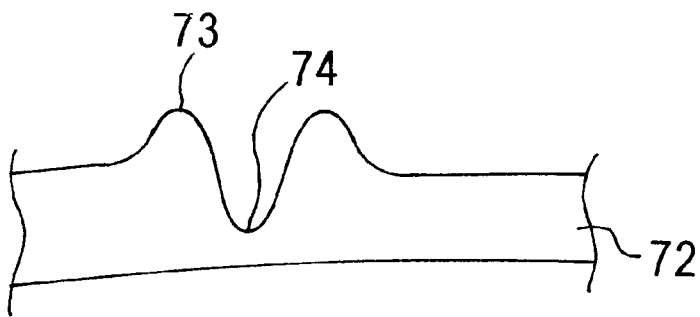
Figure 7C:
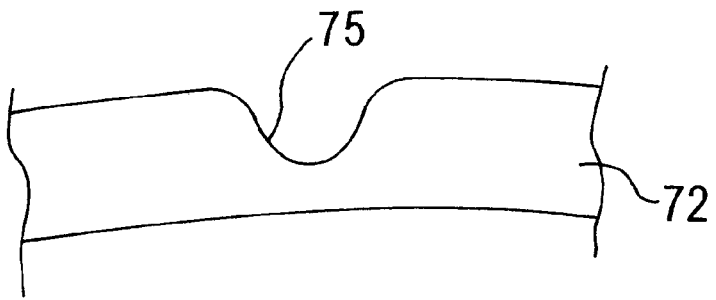
FIG. 7C illustrates the resulting pit after planarization.

Laser textured, protrusions and pits formed in accordance with embodiments of the present invention can vary somewhat depending upon the laser texturing parameters, type of laser employed and substrate. For example, FIG. 7A illustrates a typical type of protrusion 70 and pit 71 formed on a nickel-phosphorous plated aluminum substrate 72 employing a CW laser. FIG. 7B illustrates a typical protrusion 73 and pit 74 formed on a nickel-phosphorous plated aluminum substrate 72, as in FIG. 7A, but employing a pulsed laser light beam. FIG. 7C schematically illustrate a pit 75 remaining after planarizing the surface of a laser textured nickel-phosphorous plated aluminum substrate 72 whether formed employing a CW laser light beam or pulsed laser light beam.

In practicing the present invention, the substrate can comprise any substrate material typically employed in the manufacture of magnetic recording media, such as a metal substrate or alternative substrate, e.g., glass, ceramic or glass-ceramic material. It has been found suitable to employ a $CO_2$ laser when texturing a glass, ceramic or glass-ceramic substrate, and YLF, $YVO_4$, and YAG lasers when texturing a nickel-phosphorous or metal substrate.

Magnetic recording media produced in accordance with the present invention comprises laser texturing opposite surface of a non-magnetic substrate to form the servo-marks and then depositing a plurality of layers on opposite surfaces. Such layers are conventional and deposited in a conventional manner. For example, embodiments of the present invention include sequentially sputter depositing on opposite sides of the substrate an underlayer, magnetic layer and protective overcoat. A lubricant topcoat is applied to the protective overcoat.

Magnetic layers deposited in accordance with the present invention can be any of those conventionally employed in the production of magnetic recording media, including cobalt alloys. Underlayers employed in the present invention can be any of those employed in manufacturing conventional magnetic recording media, such as chromium, chromium alloys, e.g., chromium-vanadium or chromium-titanium, oxygen-doped chromium, tungsten or a tungsten alloy. Protective overcoats employed in accordance with the present invention are those conventionally employed in manufacturing magnetic recording media, and typically contain carbon.

The present invention advantageously enables the formation of micromachined servo-pits having a reduced dimension to denote the beginning and end of magnetically recorded servo-information in data tracks thereby, conserving area in the data zone consistent with the current drive for magnetic recording media having increased areal recording density. The present invention can be employed to produce any of various types of magnetic recording media, including thin film disks, with an attendant increase in areal recording density, reduced servo-tracking area and increased data-reading speed.

Only the preferred embodiment of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A magnetic recording medium comprising a surface having:
   a data zone containing substantially concentric circumferentially extending data tracks with magnetically recorded servo-information; and
   a servo-track consisting essentially of a distribution of laser textured pits extending in a substantially radial direction to divide the data zone into a plurality of sectors, the pits, forming a plurality of servo-marks capable of being sensed to enable accurate reading of the servo-information and positioning of a read/write head in the data zone.

2. The magnetic recording medium according to claim 1, wherein the pits have a substantially circular or substantially elliptical cross section.

3. The magnetic recording medium according to claim 2, wherein the pits have a substantially circular cross section with a diameter of about 0.2 µm to about 2 µm.

4. The magnetic recording medium according to claim 2, wherein the pits have a substantially elliptical cross section with a large diameter of about 0.5 µm to about 3 µm and a small diameter of about 0.2 µm to about 2 µm.

5. The magnetic recording medium according to claim 2, wherein the distribution of pits comprises a linear series of pits.

6. The magnetic recording medium according to claim 1, wherein the distribution of pits denotes the beginning and the end of the magnetically recorded servo-information in a data track.

7. The magnetic recording medium according to claim 1, wherein the servo-track comprises two spaced apart distributions of laser textured pits.

8. A magnetic recording medium comprising a surface having:
- a data zone containing substantially concentric circumferentially extending data tracks with magnetically recorded servo-information; and
- a servo-track comprising a distribution of laser textured pits extending in a substantially radial direction to divide the data zone into a plurality of sectors, the pits, forming a plurality of servo-marks capable of being sensed to enable accurate reading of the servo-information and positioning of a read/write head in the data zone wherein the distribution of pits comprises an arcuate series of pits.

9. A method of reading from or writing on a magnetic recording medium comprising a surface having: a data zone containing substantially concentric circumferentially extending data tracks with magnetically recorded servo-information; and a servo-track consisting essentially of a distribution of laser textured pits, extending in a substantially radial direction to divide the data zone into a plurality of sections, the pits forming a plurality of servo-marks capable of being sensed to enable accurate reading of the servo-information and positioning of a read/write head in the data zone, the method comprising:
- electrically or mechanically detecting one or more of the laser textured servo-marks on the surface of the magnetic recording medium;
- reading the magnetically recorded servo-information in a data track; and
- moving the read/write head to a particular position in the data zone in response to reading the servo-information.

10. The method according to claim 9, wherein the pits have a substantially circular or substantially elliptical cross section.

11. The method according to claim 10, wherein the pits have a substantially elliptical cross section.

12. A method of reading from or writing on a magnetic recording medium comprising a surface having: a data zone containing data tracks with magnetically recorded servo-information; and a distribution of laser textured pits forming a plurality of servo-marks capable of being sensed to enable accurate reading of the servo-information and positioning of a read/write head in the data zone, the method comprising:
- electrically or mechanically detecting one or more of the laser textured servo-marks on the surface of the magnetic recording medium;
- reading the magnetically recorded servo-information in a data track; and
- moving the read/write head to a particular position in the data zone in response to reading the servo-information, wherein the distribution of pits comprises an arcuate series of pits.

* * * * *